United States Patent
Ehsani et al.

(10) Patent No.: US 9,436,738 B2
(45) Date of Patent: Sep. 6, 2016

(54) MECHANICAL TURK INTEGRATED IDE, SYSTEMS AND METHOD

(71) Applicant: Nant Holdings IP, LLC, Culver City, CA (US)

(72) Inventors: Farzad Ehsani, Sunnyvale, CA (US); Silke Maren Witt-Ehsani, Sunnyvale, CA (US); Demitrios Leo Master, Cupertino, CA (US)

(73) Assignee: Nant Holdings IP, LLC, Culver City, CA (US)

( * ) Notice: Subject to any disclaimer, the term of this patent is extended or adjusted under 35 U.S.C. 154(b) by 364 days.

(21) Appl. No.: 13/866,444

(22) Filed: Apr. 19, 2013

(65) Prior Publication Data

US 2013/0282757 A1     Oct. 24, 2013

Related U.S. Application Data

(60) Provisional application No. 61/635,553, filed on Apr. 19, 2012.

(51) Int. Cl.
G06F 9/44     (2006.01)
G06F 9/45     (2006.01)
G06F 17/30   (2006.01)

(52) U.S. Cl.
CPC ..... *G06F 17/30545* (2013.01); *G06F 17/3043* (2013.01); *G06F 17/30126* (2013.01); *G06F 8/41* (2013.01)

(58) Field of Classification Search
None
See application file for complete search history.

(56) References Cited

U.S. PATENT DOCUMENTS

| | | | |
|---|---|---|---|
| 8,099,311 B2 | 1/2012 | La Vecchia et al. | |
| 8,195,498 B2 | 6/2012 | Vojnovic | |
| 2008/0155540 A1* | 6/2008 | Mock | G06Q 10/06 718/100 |
| 2010/0332281 A1 | 12/2010 | Horvitz et al. | |
| 2012/0029963 A1* | 2/2012 | Olding et al. | 705/7.14 |
| 2012/0072886 A1* | 3/2012 | McCabe et al. | 717/114 |
| 2012/0131572 A1* | 5/2012 | Shae et al. | 718/1 |
| 2012/0158732 A1* | 6/2012 | Mital | G06Q 10/06 707/741 |
| 2013/0047155 A1* | 2/2013 | Caspole | 718/1 |
| 2013/0151625 A1* | 6/2013 | Sun | G06Q 10/101 709/205 |
| 2013/0227520 A1* | 8/2013 | Hosick | 717/108 |

OTHER PUBLICATIONS

Joseph D. Novak & Alberto J. Canas, "The Theory Underlying Concept Maps and How to Construct and Use Them" [online], 2006-2008, [retrieved from internet], [retrieved on Jul. 10, 2015], <cmap.ihmc.us/docs/theory-of-concept-maps>.*

(Continued)

*Primary Examiner* — Isaac T Tecklu
(74) *Attorney, Agent, or Firm* — Stetina Brunda Garred & Brucker

(57) ABSTRACT

A Mechanical Turk-Integrated Development Environment system is disclosed. An integrated development environment (IDE) can include one or more interfaces capable of communicating with a mechanical turk engine. As a developer creates applications within the IDE, the developer can use the IDE to submit one or more requests to the mechanical turk engine. The engine constructs a mechanical turk project based on the requests and provides project tasks to workers. The results of the tasks can then be compiled and integrated back into the developer's application via the IDE. An example use includes constructing large domain specific data sets that can be applied to spoken dialog interfaces.

25 Claims, 7 Drawing Sheets

(56) References Cited

OTHER PUBLICATIONS

Hazra Imran and Aditi Sharan, "Thesaurus and Query Expansion", [online], Nov. 2009, [retrieved from internet], [retrieved on Jul. 10, 2015], <aircces.org/journal/jcsit/1109s8.pdf>.*

Yonggang Qiu, "Concept vased query expansion". [online], 1993, [retrieved from STIC], [retrieved on Jul. 10, 2015].*

Parent, Gabriel et al., "Clustering Dictionary Definitions Using Amazon Mechanical Turk," Language Technologies Institute, Carnegie Mellon University; NAACL HLT 2010 Workshop on Creating Speech and Language Data with Amazon's Mechanical Turk, pp. 21-29, Los Angeles, CA Jun. 2010.

McGraw, Ian et al., "Growing a Spoken Language Interface on Amazon Mechanical Turk," MIT Computer Science and Artificial Intelligence Laboratory, Interspeech 2011, Florence, Italy Aug. 28-31, 2011 (4 pgs).

Lee, Chia-ying, et al., "A Transcription Task for Crowdsourcing With Automatic Quality Control," MIT Computer Science and Artificial Intelligence Laboratory, Interspeech 2011, Florence, Italy Aug. 28-31, 2011 (4 pgs).

Kaisser, Michael, et al., "Creating a Research Collection of Question Answer Sentence Pairs With Amazon's Mechanical Turk," University of Edinburgh/Powerset, Inc., Interspeech 2011, Florence, Italy Aug. 28-31, 2011 (5 pgs).

Franklin, Michael J., et al., "CrowdDB: Answering Queries With Crowdsourcing," SIGMOD'11, Athens, Greece, Jun. 12-16, 2011 (12 pgs).

Audhkhasi, Kartik, et al., "Reliability-Weighted Acoustic Model Adaptation Using Crowd Sourced Transcriptions," Electrical Engineering Department, University of Southern California, Los Angeles, Interspeech 2011, Florence, Italy Aug. 28-31, 2011 (4 pgs).

* cited by examiner

MECHANICAL TURK INTEGRATED IDE, SYSTEMS AND METHOD

This application claims the benefit of priority to U.S. provisional application having Ser. No. 61/635,553, filed Apr. 19, 2012. These and all other extrinsic materials discussed herein are incorporated by reference in their entirety.

FIELD OF THE INVENTION

The field of the invention is domain-specific computer development technologies.

BACKGROUND

Many natural language processing algorithms require substantial amounts of domain relevant data in order to produce accurate results. Obtaining sufficient data economically and quickly remains an unsolved problem.

Information about a domain is especially needed for development of natural language understanding applications, including but not limited to dialog interface systems. Such systems may also be multi-modal. An important source of initial data could include a human expert; however, that data must be processed and integrated, usually through a manual process, into various modules of the system including but not limited to language models, semantic or conceptual analysis, and dialog management. In addition, to the problem of processing and integrating the expert information, the amount of data that can be obtained from a domain expert is insufficient on its own to produce a functioning system.

Because the availability of domain experts is limited; another approach is needed to expand the data obtained from domain experts into a data set sufficiently large to build a natural language and/or speech technology system such as a spoken dialog system for a domain. Still, further there is a need for integrating large domain-specific data sets into a build environment for a target application, interface, device, or other technology. For example, there is need to allow engineers or developers to integrate domain-specific data sets with applications through the use of an Integrated Development Environment (IDE). An ideal solution would enable developers to automatically collect the domain-specific data sets using an IDE which possesses the ability to directly engage an MTurk infrastructure and obtain the data sets through crowdsourcing. This solution would further automatically compile the useful and valuable data obtained from the MTurk infrastructure, compile the information into a database, and integrate the database into the application.

Crowdsourcing utilizes the labor, services, ideas, opinions or knowledge of a large group of individuals in the general public usually by means of the Internet and for little or no compensation. It can be a fast and effective way to gather a significant sampling of information.

Crowdsourcing has been an emerging technology since the internet became an effective communications tool. Crowdsourced projects have taken many forms. It was used to help build and manage Linux, a major open source computer operating system, and was instrumental in the creation of Gnu software by the Free Software Foundation.

Crowdsourcing of a different type was used by Seti, the Search for Extraterrestrial Intelligence, where users volunteered their computing resources for a large distributed signal processing attack on radio telescope data. This project, launched in May, 1999, became the largest distributed computing system in the word, and earned a place in the Guinness Book of Records.

Among the current crowdsource websites are Innocentive for scientific research and iStockphoto for sharing pictures, as well as YouTube for video sharing. Wikipedia, an extension of Nupedia founded in 2001, likewise became a crowdsourced encyclopedia, created by and continually updated by public contributions and editorial work. Most importantly, in 2005, Amazon launched its "crowdsourcing Internet marketplace", Mechanical Turk (MTurk) website. The site permits "Requesters" to submit Human Intelligent Tasks (HITs) to "Providers" over the Internet. Using the MTurk process, Requesters can obtain the information, service, etc. that they require quickly and efficiently from many Providers.

A review of crowdsourcing as of 2006 may be found in an article from Wired magazine called "The Rise of Crowdsourcing" (see URL www.wired.com/wired/archive/14.06/crowds.html?pg=4&topic=crowds&topic_set=Issue 14.06—June 2006). In that article, the authors review how people are using other people's spare cycles to create content, solve problems, and to contribute to research and development for enterprises.

As noted in the book "Crowdsourcing: Why the Power of the Crowd is Driving the Future of Business" (Jeff Howe, Random House Digital, Aug. 18, 2008), there are three primary forms of crowdsourcing in common use today. These are a. Information for the prediction market, or information market, in which the crowd purchases "futures" on some outcome b. Problem solving or Crowdcasting, in which a potential employee makes a public posting to a large community of undifferentiated workers, and c. "Idea jam", which is a "large, online brainstorming session" Howe, Jeff (Aug. 18, 2008).

Additional articles directed to the more generic use of crowdsourcing include the following:

a. Kaisser, M. and Lowe, J. "Creating a research collection of question answer sentence pairs with Amazon's Mechanical Turk", In Proceedings of the Sixth International Language Resources and Evaluation, 2008;

b. Parent, G. and Eskenazi, M. "Clustering dictionary definitions using Amazon's Mechanical Turk". In NAACL Workshop on Creating Speech and Language Data With Amazon's Mechanical Turk", 2010;

c. Franklin, M., Kossmann, D., Kraska, T., Reynold, S., "CrowdDB: Answering Queries with Crowdsourcing", Michael, SIGMOD '11, Jun. 12-16, 2011, Athens, Greece, ACM 978-1-4503-0661-Apr. 11, 2006.

The first two articles (a and b) merely provide examples of the use of MTurk crowdsourcing for either research or as a resource to be used in natural language processing. In the third article (c), the authors review using crowdsourcing to augment database look and search tasks. The article and the methods described do not help build a better or improved system. The article does describe how to formulate micro-tasks and how to manage the user interface to get these accomplished.

Prior research work exists on using crowdsourcing for other tasks per se such as transcription (Lee, C and Glass, J "A Transcription Task for Crowdsourcing with Automatic Quality Control" Proceedings of Interspeech Aug. 28-31, 2011, pages 3041-3044), acoustic modeling for automatic speech recognition (Audhkhasi, K. et al, "Reliability-Weighted Acoustic Model Adaptation Using Crowd Sourced Transcriptions" Proceedings of Interspeech Aug. 28-31, 2011, pages 3045-3048), and for building human-in-the-loop applications (McGraw, I. et al. "Growing a Spoken Language Interface on Amazon Mechanical Turk", Proceedings of Interspeech Aug. 28-31, 2011, pages 3057-3060). The prior work fails to provide an automated method for expanding small amounts of in-domain expert data into data sets large enough to support development of a speech and natural language system for the domain. More importantly, the prior work fails to describe any innovation in the development of an IDE or software application development tool that directly engages the MTurk infrastructure.

Several patents have been applied for or granted in the use of crowdsourcing for utilizing the collective intelligence of crowds.

a. U.S. patent application 2010/0332281 A1 to Horvitz and Shahaf titled "Task Allocation Mechanisms and Markets for Acquiring and Harnessing Sets of Human and Computational Resources for Sensing, Effecting, and Problem Solving", filed Jun. 26, 2009;

b. Application 2012/0293016 to Milan Vojnovic, Dominic Daniel DiPalantino titled "Crowdsourcing" describes using contests for optimizing results in crowdsourcing for logo design, code writing, or question answering".

c. U.S. Pat. No. 8,099,311 to Gioacchino La Vecchia, Alberto Colombo, Massimo Piccioni titled "System and method for routing tasks to a user in a workforce" describes using previously collected skills profiles to accomplish Enterprise tasks".

Finally, the USPTO itself is using crowdsourcing to assist in analyzing the suitability of patents for issue. It has asked for assistance using the web site patents.stackexchange.com/, which was fielded in 2012.

The prior work fails to provide an automated method for expanding small amounts of in-domain expert data into data sets large enough to support development of a speech and natural language system for the domain. Furthermore, the prior work fails to describe any innovation in the development of an IDE or software application development tool that directly engages the MTurk infrastructure.

These and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

In the discussion of systems and methods for the searching of databases using natural language sound data, crowdsourcing has been cited as a useful tool. For example, U.S. patent application publication 2012/0233207 to Mohajer titled "Systems and Methods for Enabling Natural Language Processing", filed May 24, 2012, describes the need to use natural language libraries when determining the meaning of the sound data. Methods to generate these natural language libraries are described. The work additionally indicates that crowd sourcing can be used to generate an aggregated natural language library from content generated by many separate service providers or developers. The work merely describes the possible use of crowdsourcing as a means to supplement or improve natural language libraries for use in database searches using speech recognition input. The work fails to address the need for an IDE or software application development tool that gathers crowdsourced information by directly engaging the MTurk infrastructure.

Other work describes a job distribution platform for evaluating and training a worker who performs crowd sourced tasks online. U.S. patent application publication 2013/00061717 to Olsen et al. titled "Evaluating a Worker in Performing Crowd Sourced Tasks and Providing In-Task Training Through Programmatically Generated Test Tasks", filed Oct. 17, 2011, describes a platform through which crowd sourced tasks are presented to workers. One method involves generating test tasks with known correct or incorrect results and presenting the test task to a worker to evaluate the quality of a worker. The work fails to describe or envision the value of an IDE or software application development tool that gathers crowdsourced information by directly engaging the MTurk infrastructure.

In U.S. patent application publication 2009/0240652 to Su et al. titled "Automated Collection of Human-Reviewed Data", filed Mar. 19, 2008, the claimants describe an automated system that collects, analyzes, and seeks to improve human-reviewed data. The work specifically relates to the MTurk infrastructure and the automated collection of human-reviewed data (HRD). A data processing system which is in communication with one or more systems for collecting human-reviewed data. Wrappers which store parameters specific to the data requests and libraries for transforming the data requests to human intelligent tasks (HITs) are described. The data processing system is claimed to possess a number of components that facilitate transforming and sending HITs to the HRD collection systems and receiving and analyzing HRD from the HRD collection system for purposes of improving the quality of the collected HRD. The data processing system described however fails to possess the abilities of an IDE or software application development tool that gathers crowdsourced information by directly engaging the MTurk infrastructure.

Another work specifically relates to the MTurk infrastructure. U.S. patent application publication 2012/0158732 to Mital et al. titled "Business Application Publication", filed Dec. 17, 2010, discusses a crowd sourcing infrastructure allowing clients to customize decision applications. The work describes the use of the MTurk infrastructure in developing or distributing applications. Applications are electronically submitted to a data warehouse via a data feed. After users select and download submitted applications, they can be evaluated and customized by the user. Subsequently, customized applications can be submitted to the data warehouse for publication with other applications. Other applications may be created through an automated generation process. In some automated generation implementations, an autogenerator engine searches a library of existing applications for visualization and business logic expressions that may be applicable to the data of the data feed. The development process described system described however fails to possess the abilities of an IDE or software application development tool that gathers crowdsourced information by directly engaging the MTurk infrastructure. Furthermore, the work does not disclose construction of a library based on MTurk work submitted from a development tool.

Thus, there yet exists a need for an efficient automated method for expanding expert data into a larger domain specific data set using an IDE or software application development tool that gathers crowdsourced information by directly engaging the MTurk infrastructure.

These and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

Unless the context dictates the contrary, all ranges set forth herein should be interpreted as being inclusive of their endpoints, and open-ended ranges should be interpreted to include commercially practical values. Similarly, all lists of values should be considered as inclusive of intermediate values unless the context indicates the contrary.

SUMMARY OF THE INVENTION

The inventive subject matter provides apparatus, systems and methods in which one can use an IDE to expand modest amounts of domain-relevant language data from a domain expert into a large data set for the domain using crowdsourcing via a Mechanical Turk (MTurk) system. One aspect of the inventive subject matter includes an application development system, which can include an application developer engine and an MTurk engine. The development engine, possibly in the form of an IDE, allows a developer to create one or more projects (e.g., applications, devices, software, etc.) that have domain-specific requirements. The MTurk engine preferably communicatively couples with the development engine over a network (e.g., LAN, WAN, Internet, etc.). Further, the MTurk engine is configured to receive an MTurk request from the development engine and convert the request into one or more MTurk projects. When the project is complete, or portions of the project's results become available, project results can be returned to the application developer engine for incorporation or integration to an application development project.

Another aspect of the inventive subject matter can include an Integrated Development Environment (IDE) apparatus. Contemplated apparatus include a developer interface, possibly based on a workstation or through a browser, which is configured to build applications for computing devices. The developer interface can further be configured to generate or submit an MTurk request to an MTurk engine via an MTurk engine interface. For example, a person developing a reservation system might use their IDE to send an MTurk request to an MTurk engine where the request causes the engine to instantiate an MTurk project. Sending of MTurk requests can be hidden from the user, that is, the user can be asked to enter domain specific example words, speech etc. and the IDE can convert those entries into MTurk requests. The MTurk project could request information from MTurk members about preferred words, speech, or dialogs that could indicate a person wishes to make reservation.

Yet another aspect of the inventive subject matter includes an MTurk engine. Contemplated MTurk engines include an IDE interface capable of interfacing with one or more remote IDEs. An MTurk engine can also include a project engine that instantiates an MTurk project based on a request obtained from one or more remote IDEs. Preferred MTurk engines also include a member interface presented to project members and through which an MTurk engine obtains the member submissions. The project engine can derive one or more project results, which can then be submitted back to the IDE for incorporation into a build project. For example, the project results could include multi-modal data packaged in the form of an IDE module (e.g., library, file, object, etc.) that integrates with the IDE or with an application built by the IDE.

Yet another aspect of the inventive subject is that the initial concepts created by a subject matter expert can also be expanded via two additional methods. One method would look up the initial concepts in a phrase thesaurus which is a pre-built corpus of meaning invariant units. In a simplified manner one can see this as a sophisticated synonym look-up mechanism.

The other method involves automatically expanding the MTurk project by adding external data sources that match the domain of the MTurk project with the help of a series of text-normalizing scripts. This can happen in parallel with the creation of the MTurk expansion requests.

Various objects, features, aspects and advantages of the inventive subject matter will become more apparent from the following detailed description of preferred embodiments, along with the accompanying drawing figures in which like numerals represent like components.

DETAILED DESCRIPTION

Figure 1:
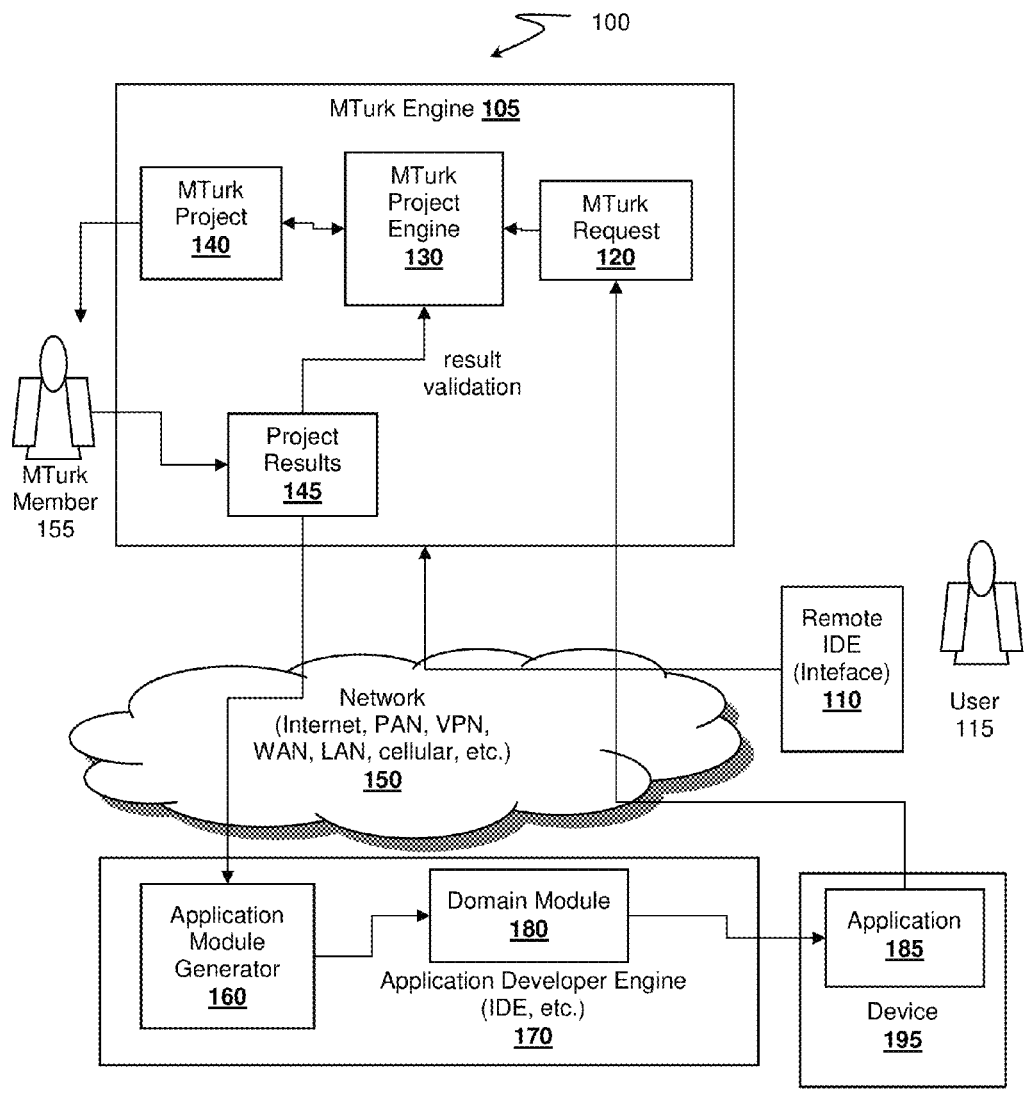
FIG. 1 is a schematic overview of the system.

It should be noted that while the following description is drawn to a computer/server based development system, various alternative configurations are also deemed suitable and may employ various computing devices including servers, interfaces, systems, databases, agents, peers, engines, controllers, or other types of computing devices operating individually or collectively. One should appreciate the computing devices comprise a processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed below with respect to the disclosed apparatus. In especially preferred embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges preferably are conducted over a packet-switched network, the Internet, LAN, WAN, VPN, or other type of packet switched network.

One should appreciate that the disclosed techniques provide many advantageous technical effects including supporting integration of data input from domain experts with data expansion using crowdsourcing. Integration of an IDE with a remote Mechanical Turk system provides for the creation of data sets capable of being integrated within an application. For example, digital signals received from the Mechanical Turk system can be converted to compiled data or libraries. Such an approach allows for the creation of libraries that are 50, 100, 200, or more times larger than would be possible without such a crowdsourcing infrastructure.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Further, the terms "coupled to" and "coupled with" are used euphemistically to represent "communicatively coupled with" where two are more networked devices are able to exchange data over a network, possibly via one or more intermediary devices.

The following disclosure describes the integration of an Integrated Development Environment (IDE) with a back-end mechanical turk (MTurk) system where the IDE is able to obtain and leverage MTurk data as part of application development. An acceptable MTurk that can be suitably adapted for use includes the Amazon Mechanical Turk framework (see URL www.mturk.com/mturk/welcome). Other MTurk engines can also be used with the inventive subject matter.

FIG. 1 illustrates an overview of system 100, which comprises a possible embodiment of crowdsourcing MTurk engine 105 capable of integrating with remote IDE 110. IDE 110 provides the framework for connecting domain specialists' input to the crowdsourcing resources and automating the process of data expansion. For example, subject matter expert 115 can create a set of seed example concepts or words using remote IDE 110 for the particular domain for which a multi-modal interaction application is being created.

One should moreover appreciate that FIG. 1 illustrates an application development system 100, which can include an application developer engine 170 and a Mechanical Turk engine 105, possibly an MTurk engine that is unrelated to the application developer engine 170. In some embodiments, the application developer engine 170 allows developers to create applications capable of participating in multi-modal interactions with a user, especially interactions involving dialog. For example, a developer might wish to create a smart phone-based shopping application that allows users to provide speech input to direct purchases. The developer uses the developer engine 170, possibly functioning as an IDE on a computing device, to create the application and integrate possible interaction features into the application. The developer might have a limited number of recognizable phrases (e.g., "Purchase item" or "Buy item") integrated into the application. The IDE can use this small number of phrases as a foundation or seed element for an MTurk project. Such phrases represent the initial requests 120. These initial requests 120 are converted into MTurk projects 140 for consumption by MTurk project engine 130. For example, the initial request 120 might include these two seed phrases along with other information about the project: project name, project owner, fee information, account information, number of HITs, project requirements, domain requirements, or other information.

Each MTurk project 140 gets presented to MTurk members 155 for execution. In the current example, the project might require native English speakers to provide additional spoken ways to instruct a device, person or other entity to purchase an item. Project results 145 could include individual phrases or could include a corpus of results aggregated from the project members. The results 145 can be provided as raw data (e.g., text data, audio data, image data, etc.) or as a serialized data stream.

When an MTurk member has completed the task, the resulting MTurk project results 145 are sent back to the MTurk project engine 130, possibly over network 150. In more preferred embodiments, the project results comprise mappings from a communication modality to one or more concepts.

First, the MTurk project engine 130 can perform automated validation operations such as, for example, merging results from multiple MTurk members 155 (e.g., individuals, people, or other entities), spell-checking, punctuation checking and removal of unreliable results. Sample embodiments of such validation operations can comprise one or more scripts written in any common programming language (e.g., c, c#, python, perl, ruby, etc.). In a possible embodiment, the MTurk project engine 130 can comprise of a library of such scripts. The determination as to which script to use for which MTurk task is done via a look-up table. Such table can be a simple tab-delimited table or based on standard database language such as SQL, Oracle, or MySQL. Following the automated validation, the MTurk project engine 130 might create validation MTurk projects 140 depending on settings and the type of project tasks. Many different forms of validation can be envisioned such as having two or more MTurk members 155 validate the same project results 145. Only if two or more MTurk members 155 agree upon the validity of a project result 145, will the result then be considered validated. In a possible embodiment of the system disclosed herein, all project results 145 can be stored in database tables on cloud-based servers. All results 145 can annotated with data such as project ID, timestamp, MTurk member ID and if available MTurk member survey questions answers such as gender, geographic location and so forth. Following validation, if so configured, project results 145 can be sent via a network 150 to an application module generator 160. This module 160 compiles project results 145 into a domain module 180. The exact format of result inclusion depends on the individual project result types. Results 145 can include compiled data, serialized data, compressed data, compiled libraries, script files, audio file, video files, or other forms of data that can be integrated within an application via an IDE such as application developer engine 170. In general an MTurk engine 105 can have rules for the processing, formatting, validating etc. for a number or set of different MTurk project types. Sample embodiments of such project types are discussed below in more detail.

In more preferred embodiments, the contemplated system can include an application module generator that converts the project results into a domain module 180 formatted for integration or compilation via the application developer engine 170. Perhaps the project results 145 comprise a serialized list of hundreds or thousands of text phrases that describe purchasing the item. The corresponding domain module 180 might be a library of phrase objects with attributes through which the application can match spoken input to known phrase objects in the library. In some embodiments, the project results returned to the application developer engine 170 are in the form of the domain module.

In such cases the application module generator 160 is local to the MTurk engine. In other embodiments, the application developer engine 170 can comprise the application module generator 160.

As discussed above, the application developer engine 170 is preferably configured to generate one or more applications for a computing device 195 where the application incorporates the project results. Furthermore, the applications can also configure the computing device to obtain additional project results so that the computing device 195 gains greater flexibility as time passes. For example, the device 195 can learn and thereby modify its behavior as additional results are obtained. Thus the inventive subject matter is considered to include updating results 145 based on actual use of application 185.

Note that when the application 185 is in use, data can be collected and that data can be automatically sent back to the MTurk engine 105 for future data expansion. In particular, new MTurk requests 120 can be created from the application data.

It is important to note that the two input mechanisms to the MTurk engine depicted in FIG. 1 allow for a continuous expansion and validation of an application. That is, initially requests 120 are initiated by users 115 who might be subject matter experts or other trained users. Subsequently, data from live users is used for additional coverage expansion and also for validation. The integration of the application developer engine 170 with the MTurk engine 105 allows the developer to steer the expansion and update process of an application 185.

The MTurk engine 105 itself can be adapted for interacting with remote subject matter experts as well as developers. In some embodiments, the MTurk engine 150 can include an IDE interface capable of receiving MTurk requests 120 from one or more remote IDEs 110 or application developer engine 170. A project engine within the MTurk engine 105 instantiates a Mechanical Turk project 140 based on the result and presents the project as being available to potential project members via a member interface (e.g., a web browser). Project members attempt to fulfill the goals of the project by submitting their results back to the project engine.

One should appreciate there are numerous techniques through which application developer engine 170, possibly operating as an IDE, can interface to MTurk engine 105 to create MTurk project 140. In some embodiments, the application developer engine 170 can be a priori configured with a web services API through which it can submit data to MTurk engine 205. For example, Eclipse™, Visual Studio™, or other development environment can be instrumented with a library of web services that target Amazon's mechanical turk system. The library can include APIs through which the development environment can access Amazon's exposed services. Example APIs could include one or more APIs that create a project, name a project, define task criteria, define MTurk member requirements, define MTurk member interface requires, define payment or account transaction criteria, assign project IDs, create data structures for project results 145, retrieve project results 145, exchange information with MTurk member 155, monitor MTurk project 140, obtain reports on MTurk project 140, activate or deactivate projects, login or register with MTurk engine 105, or other such features. For example, the MTurk engine 105 would call a 'submitData' function to send the MTurk generated data to the application developer engine. Such API call would have parameters to specify the task-type for which the data had been generated, the format of the new data and so forth. Within the application developer engines there might be tables that define which update operations the engine 170 should perform based on the type of the new data. Use of web services APIs via developer engine 170 might require modification of MTurk engine 105 by require MTurk engine 105 to offer web services over an HTTP server interface. Such an approach is considered useful because it offers a more precise interface between development of application 185 and project results 145. Although some embodiments leverage an HTTP interface (e.g., SOAP, WSDL, HTTP, etc.), one can leverage other protocols or formats to exchange project data between application development engine 170 and MTurk engine 105 (e.g., XML, XMPP, TCP/IP, UDP/IP, SSL, proprietary protocols, etc.).

In other embodiments, application developer engine 170 can include one or more interfaces that consumer existing MTurk engine 105 web-based or browser-based interfaces. Developer engine 170 can auto-populate web-based forms or fields for the developer, assuming once any require authentication or authorization has been achieved. Such an approach is considered advantageous because it does not require existing MTurk engines to alter their existing services.

Regardless of the nature of the interface between application developer engine 170 and MTurk 105, application developer engine 170 can consume project results 145 via application module generator 160. Application module generator 160 optionally converts or translates project results 145 from their existing format into an application module, if required. In some embodiments, projects results 145 can already be in a desirable format (e.g., raw data, audio files, images, scripts, data files, data records, etc.) without requiring additional post processing. In other embodiments, application module generator 160 consumes project results 145 to create the application module. Example application modules can include files (e.g., source control files, script files, image files, audio files, text files, etc.), a database having records generated from project results 145 (e.g., translations, utterances, expressions, etc.), a library of callable functions (e.g., DLLs, .JAR, .LIB, .CAB, etc.), compiled code, serialized data structures (e.g., XML, GUI definitions, configuration files, preferences, etc.), domain modules 180, or other data that can be integrated within application 185.

The application developer engine 170 can be implemented with any common programming language (e.g., c, c#, Python, Perl, Ruby, etc.). It can contain a number of internal functions as well that execute the necessary steps of incorporating the new data into an updated domain module 180. Developer engine 170 can further include yet another table that contains a mapping as to which update operations need to be performed dependent on the new data type. Examples of update operations might be adding sentences to adding sentences to a language model training set and to train a language model, to update food database information, to update concept mapping rules, to update the selection of which GUI screen version to incorporate into a final application and so forth. Further, developer engine 170 can include a set of functions that result in updated files external to the application developer engine 170, most importantly functions to update the domain module 180 and then to update the application 185 on a computing device 195.

Figure 2:
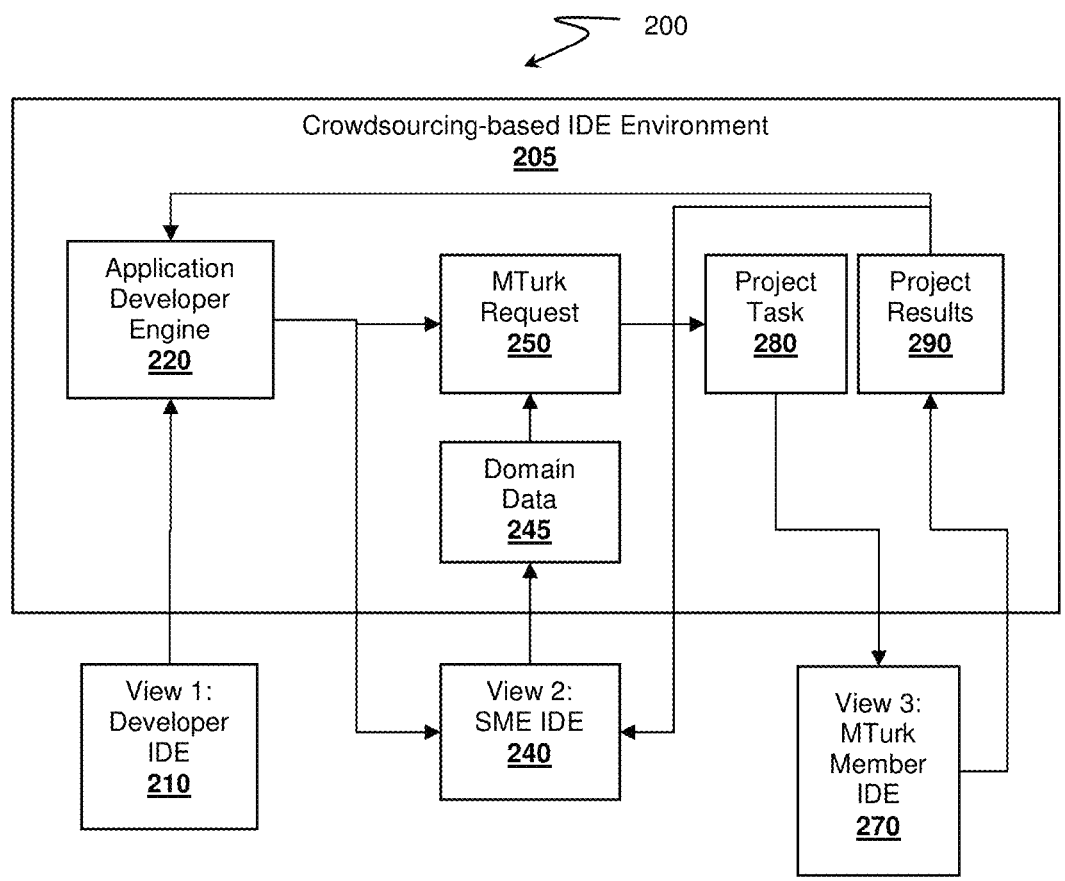
FIG. 2 provides a more detailed overview of an IDE.

FIG. 2 illustrates the three different IDEs representing access points or interfaces to an integrated crowdsourcing-based development environment 205. Each of the three IDEs can comprise of administrative pages where the user can configure properties such as HIT qualifications, payment, posting times, and user management. Yet other pages can be for the actual hit creation. These pages might include a drag-n-drop design environment for creating mobile application screen mock-ups, or for uploading pictures, or for uploading tasks instructions where the task variations are programmed via variables. The application developer IDE 210 provides the application view and access for an application developer. Via this view, the developer can add or modify content of the application development engine 220. The remote or subject matter expert (SME) IDE 240 provides the SME with access to all domain specific components of an domain data 245 such as the interaction guides, the corpus, the natural language understanding engine and the acoustic data. The SME IDE 240 also allows creating and approving MTurk requests 250 that were generated based on changes in the domain specific data 245. The MTurk IDE 270 enables MTurk members to accept project tasks 280 and to submit project results 290. Possible embodiments of this MTurk IDE can allow for multi-modal input, i.e. for audio, touch (mouse-click) and text input.

Note that possible embodiments of such IDEs as in system 200 can be web-based interface written in standard web-programming language such as java, html-5, perl, ruby-on rails. The developer IDE 210 in particular also might consists of a simple command line interface were the developer has access to a series of command scripts, or script that execute a series of steps.

Contemplated application developer engines 220 can also include the IDE apparatus as indicated above. The IDE environment 205 can include a developer interface configured to allow a developer to create or build applications for a computing device. Example IDEs that could be suitably adapted include Visual Studio®, Eclipse, or other IDEs. Preferred developer interfaces are configured to generate, possibly automatically generate, an MTurk request 250. The IDE apparatus can further include an MTurk interface through which the MTurk request is sent over a network to an MTurk engine. In some embodiments, the MTurk request can include an MTurk project that has sufficient information to allow the MTurk engine to instantiate a new project or modify an existing project.

An example of such application developer engine would be an Eclipse™ environment to encode interaction guides for a multi-modal dialog system. Suitable techniques for interaction guide creation can be found in the co-owned provisional application having Ser. No. 13/780,645, to Ehsani et al. titled "Spoken Control for User Construction of Complex Behaviors" filed Feb. 28, 2013. Within an interaction guide, an SME would enter sets of seed phrases that are associated with the interactions that are covered by the respective interaction guide. The developer then has the option to initiate via an IDE request an MTurk project that consists of requests to create variations of these seed phrases. For example, if the seed phrase is 'I'd like to fly to San Francisco next Monday', then variations might include 'I'm looking for a flight to San Francisco next Monday' or 'Show me flights to San Francisco leaving next Monday'. The MTurk project consists of asking MTurk members to create such variations as well as follow-on Project Tasks that consist of other MTurk members validating the new variations. The MTurk engine then executes a set of scripts for formatting and other clean-up and the final, cleaned, new variations become the project result that is returned to the developer engine.

Figure 3:
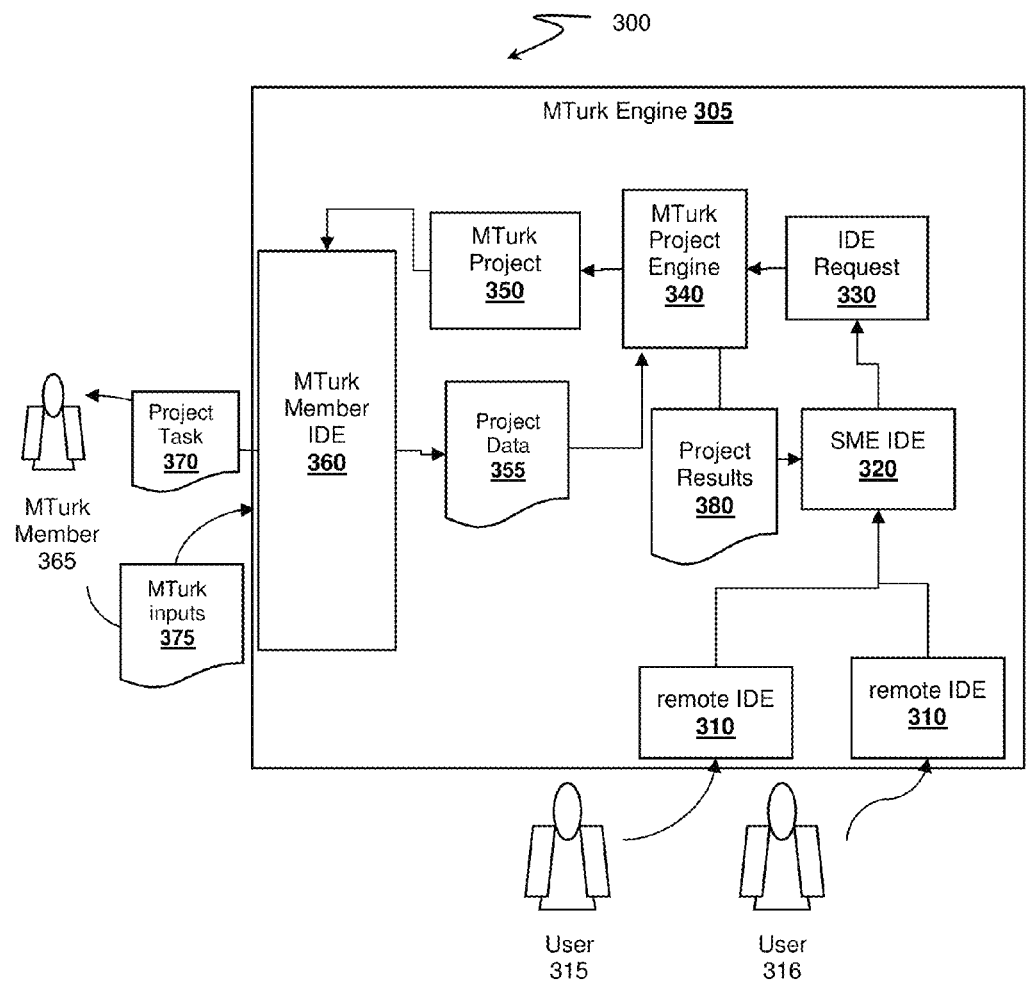
FIG. 3 provides a more detailed overview of an MTurk engine.

FIG. 3 shows the system 300 from the perspective of an MTurk member. MTurk members 365 receive and choose project tasks 370 that are presented to them via the MTurk member IDE 360. The project tasks 370 can require the MTurk member to enter data in a number of different modalities, for example, typing, touch, or audio. The MTurk member IDE 360 (e.g., browser interface, app, etc.) receives the MTurk inputs 375 and sends them on as project data 355 to the MTurk project engine 340. This project engine 340 stores and processes all project data 355 according to the type of task associated with an MTurk task 370. Following this, the processed project data 355 is stored in a database as project results 380. For example, if the project task was to record sentences, the project engine would store the recorded audio with links to the transcriptions associated with the audio. Additionally, the MTurk project engine 340 might also initiate a transcription task for the recorded audio and then update the project results 380 accordingly once the transcriptions have been received.

Another example of the capabilities of the MTurk project engine 340 would be to process all MTurk inputs 375 for a particular task and then calculate average data parameters such as the number of new, unseen words. Yet another example would be for the MTurk project engine 340 to calculate a total number of user errors if the task was an MTurk-based usability simulation.

After conclusion of automated processing the MTurk engine 340 can send the project results 380 to the SME IDE 320 which in turn includes at least one remote IDE 310 that is accessed by one or more users 315 or 316. These users can review the project results 380 and decide upon initiating new IDE requests 330 that are sent to the MTurk project engine 340 which, in turn, again generates MTurk projects 350 that can be presented to the MTurk members 365 via the MTurk member IDE 360.

Figure 4:
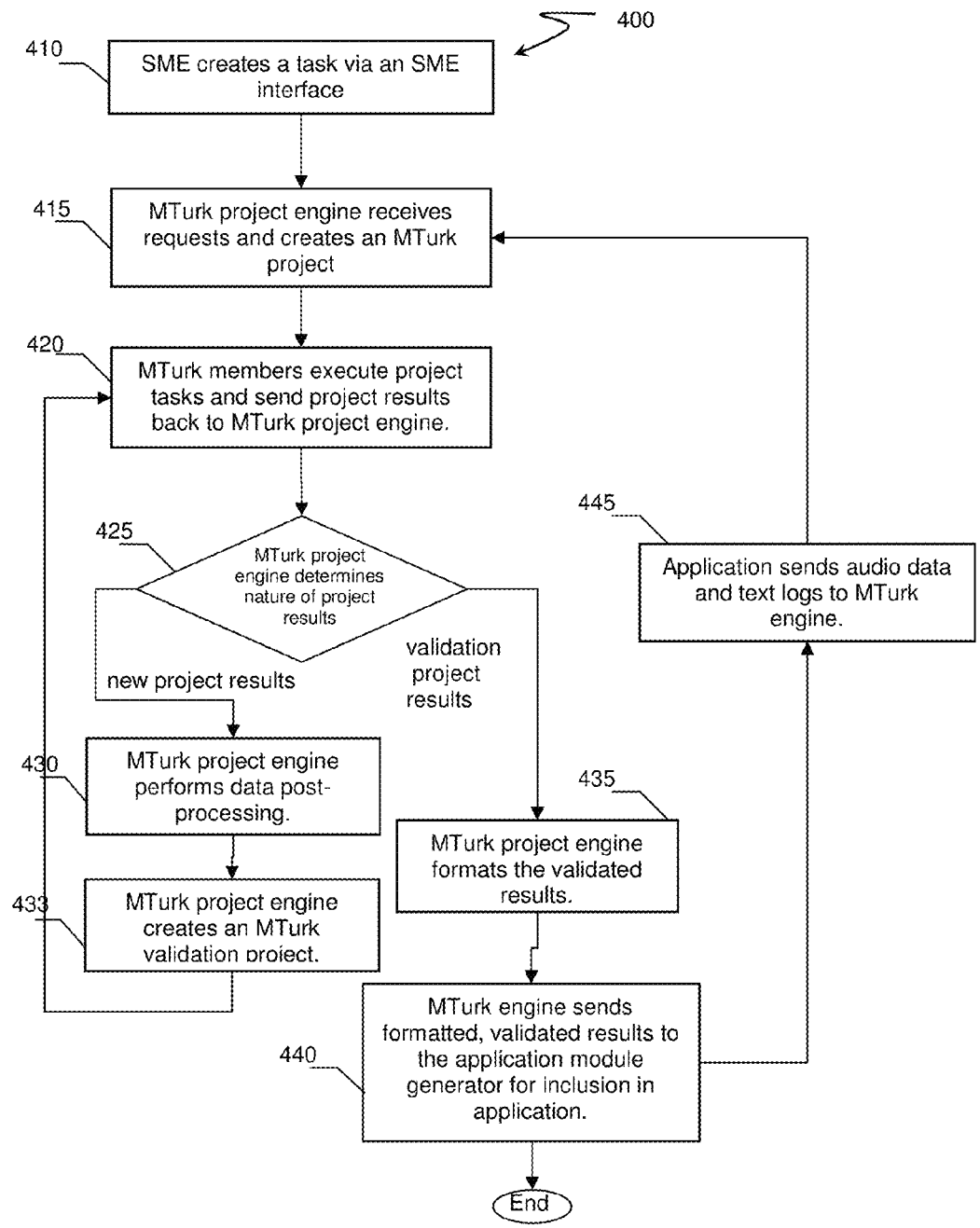
FIG. 4 illustrates a method of application expansion via an MTurk engine.

FIG. 4 illustrates method 400 of expanding the coverage or accuracy of an application with the help of the matter disclosed herein. FIG. 4 represents a generic and overarching depiction illustrating of the techniques disclosed herein, whereas FIGS. 5, 6 and 7 will discuss example embodiments of the generic technique.

As the first step 410, a task is created via an SME IDE. For example, one or more SME(s) can be contacted and provided with a login to an SME IDE through which they can provide seed content. In some embodiments, the interface can include an IDE, web site, web service, API, or other interface through which an SME can create a task. A task can include one or more instances of the seed content, instructions, required MTurk member attributes, or other properties. A task can request input from MTurk members in at least one modality of communication which comprises at least one of human speech, text, visual data, kinesthetic data, auditory data, location data or other modalities.

Figure 5:
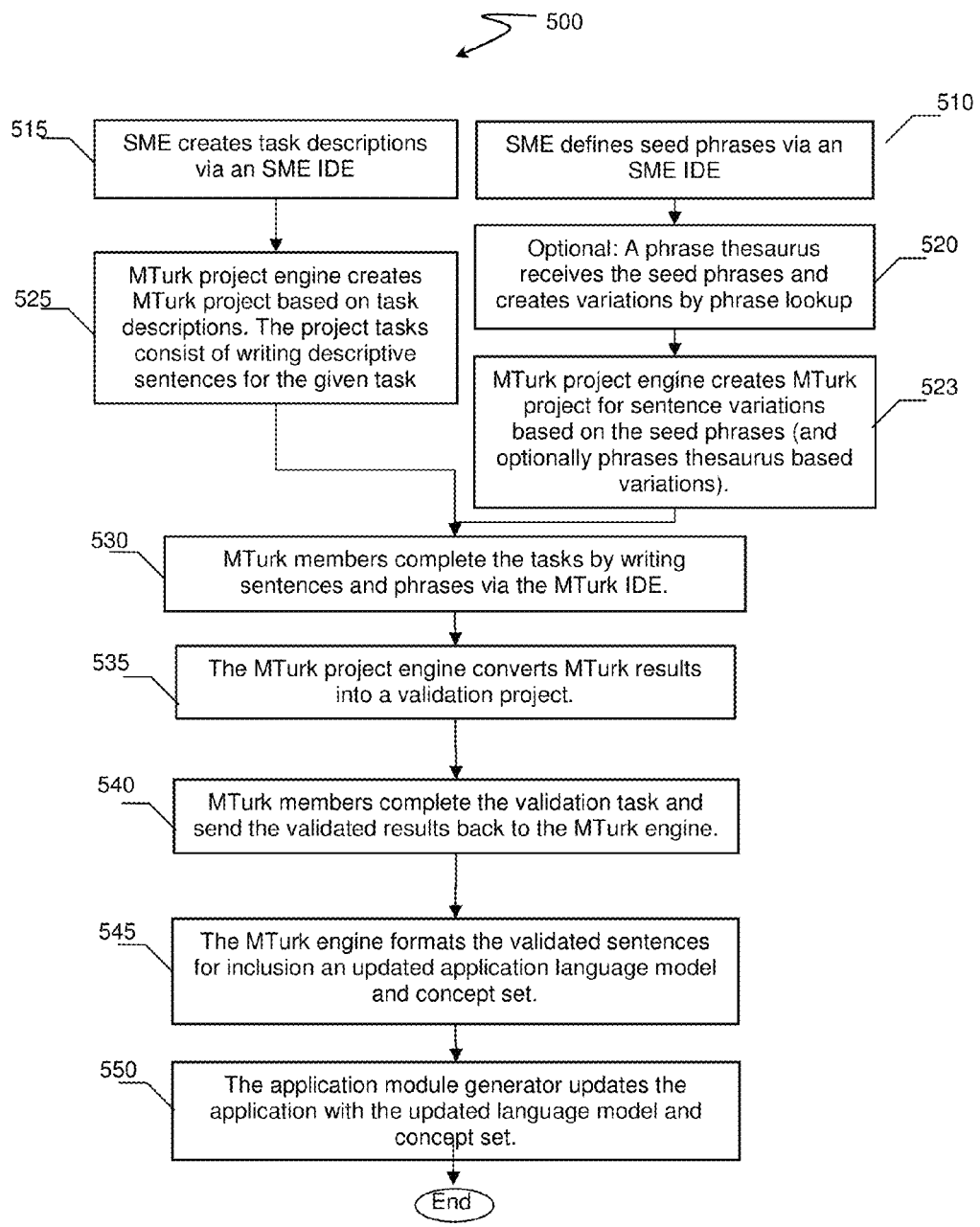
FIG. 5 illustrates a method for application language model enhancements based on an MTurk engine integration.
Figure 6:
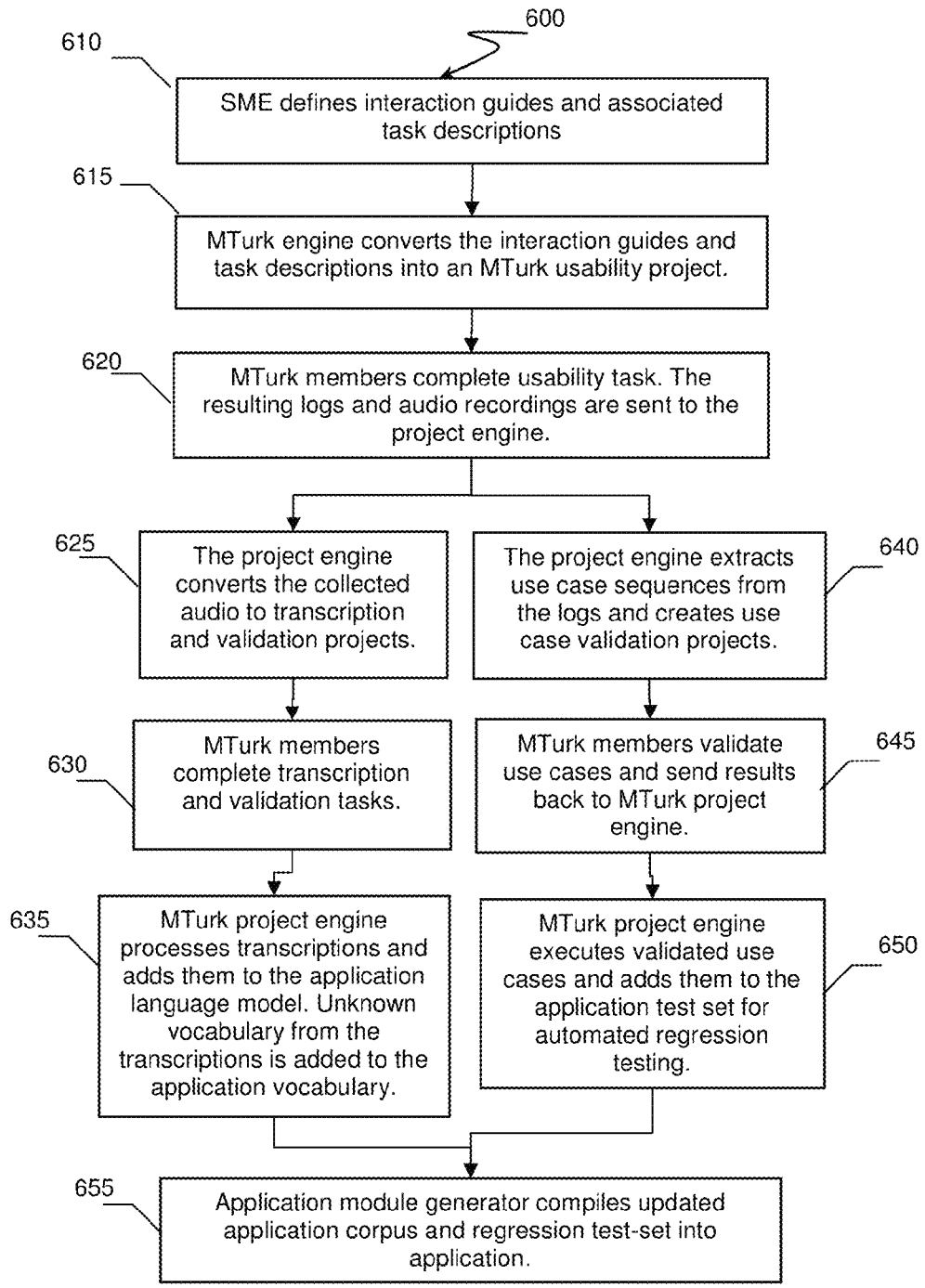
FIG. 6 illustrates a method where a usability-centered version MTurk engine is used to generate application data.
Figure 7:
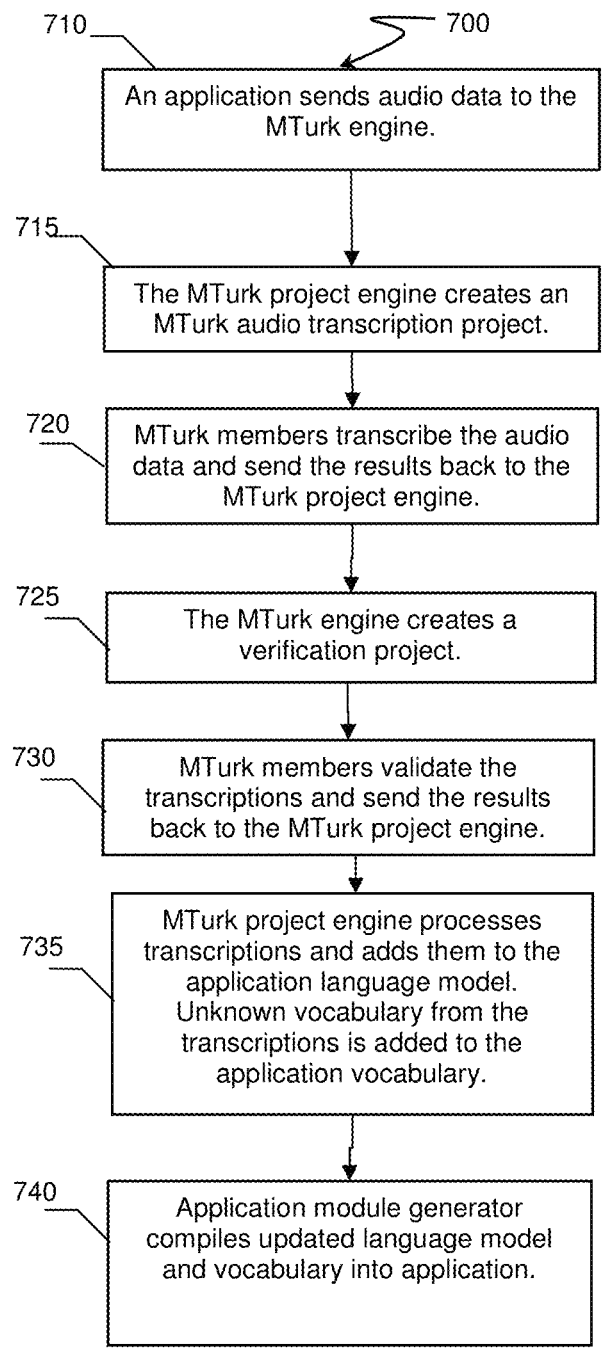
FIG. 7 illustrates a method for audio transcription and validation for an application based on an MTurk engine integration.

Step 415 can include converting the tasks into an MTurk project. The MTurk project can comprise multiple tasks bound together. Also, the MTurk project can comprise of many different types of tasks. The discussion of FIGS. 5, 6 and 7 provides examples of such tasks.

Step 420 can include accepting and executing project tasks. The project results that are obtained are sent back to the MTurk engine. One should further appreciate that project results can also include conceptual mappings in addition to, or in lieu of, text or spoken phrases. This is especially true when multiple modalities are taken into consideration. Thus, the project results could include meaning derived from one or more modalities of communication including human speech, text, visual data, kinesthetic data, auditory data, taste data, ambient data, tactile data, haptic data, location data, or other types of data.

The nature of the task is then determined at step 425. If the task consisted of MTurk members generating new data, then the MTurk project engine can post-process, i.e. format the project results at step 430. The MTurk project engine can create an MTurk validation project 433 that in turn can also be presented to MTurk members for execution at step 420.

If the nature of the task consists of validating prior project results, then the MTurk engine can convert the validated results into a format that is ready for inclusion into an application at step 435. The MTurk engine sends at step 440 the formatted and validated results to the application module generator in an application.

The application can send multi-modal input data and application logs to the MTurk engine at step 445. These application data can again be converted into MTurk project tasks at step 415.

Possible different embodiments of this method 400 are illustrated in FIGS. 5, 6 and 7. These figures illustrate the set of different task types for which data might be generated by the MTurk engine in order to expand the functionality of an application.

FIG. 5 illustrates how the invented matter can be configured to expand the language model and the concept set of an application. Either an application developer or an SME can define a set of seed phrases for the desired corpus using the SME IDE at step 510. Optionally, a phrase thesaurus at step 520 may receive the seed phrases and create phrase variations by looking up the variations for all phrases and phrase combinations in the seed data. The creation of a domain specific phrase thesaurus is described in the co-owned application having Ser. No. 10/096,194, titled "Phrase-Based Dialogue Modeling with Particular Application to Creating a Recognition Grammar for a Voice Controlled User Interface" filed Mar. 3, 2002. Next, the MTurk engine then creates an MTurk project at step 523 for the creation of sentence variations based on seed phrases and possibly any phrase variations obtained from the phrase thesaurus at step 520.

The SME might also possibly create task descriptions using the SME IDE. The purpose of such task description is for the system at step 500 to be able to create MTurk projects that require MTurk members to generate a series of sentences covering the task description. For example, the task description might be something along the line as "imagine you are talking to a Travel agent in order to book a flight from San Francisco to New York. Please write down this imaginary conversation, clearly indicating what you are saying and what the travel agent is saying". The MTurk engine can take such task descriptions to create an MTurk project at step 525 based on the task descriptions.

MTurk members at step 530 complete their tasks via the MTurk IDE by writing the requested sentences and phrases. The MTurk project engine at step 535 converts the MTurk results into a validation project. MTurk members complete at step 540 the validation task and the results are sent back to the MTurk engine. The validation projects results are subsequently processed and formatted at step 545 and included in the updated application language model. Additionally, results might be added to the concept set of an application in order to create an expanded concept set. A concept set can be seen as a cluster of phrases which similar or related meaning. Lastly, the application module generator at step 550 updates the application with the updated language model and updated concept set.

FIG. 6 illustrates method 600 where language models and concept sets can be updated, expanded or improved by means of usability testing. A SME at step 610 defines one or more interaction guides and associated task descriptions.

The MTurk engine at step 615 converts the interaction guides and task descriptions into an MTurk usability project. MTurk members at step 620 complete the usability tasks and the resulting logs and audio recordings are sent to the project engine. The project engine at step 625 converts the collected audio to transcription and validation projects. Simultaneously, the project engine at step 640 extracts use case sequences from the logs and creates use case validation projects. MTurk members complete the transcription and validation tasks at step 630 and MTurk members validate use cases at step 645 and send results back to the MTurk project engine. The MTurk project engine processes the transcriptions and adds the transcriptions at step 635 to a language model training set and compiles an updated language model. Note that the quality or performance of a language model depends on the size of its domain-specific training set. Novel or unknown vocabulary from the transcriptions is added at step 635 to the application vocabulary.

In step 650 the MTurk project engine executes validated use cases and adds the cases to the application test set for automated regression testing.

At step 655 the compiled language model is then passed to the application developer engine which can load the updated language model into the domain module.

FIG. 7 illustrates method 700 where an application can be updated based on automatically collected data from the same application.

Step 710 includes sending audio data and text logs collected from users to the MTurk engine.

The application can be configured to send all data or only data that has a recognition confidence below a certain threshold to the MTurk project engine at step 710. The MTurk project engine creates at step 715 an MTurk audio transcription project. MTurk members at step 720 transcribe the audio data and send the results back to the MTurk project engine. The MTurk engine then creates at step 725 a verification process. MTurk members at step 730 complete the verification process and send the results back to the MTurk project engine. The MTurk project engine processes the transcriptions and adds the transcriptions at step 735 to the application language model. Novel or unknown vocabulary from the transcriptions is added at step 735 to the application vocabulary. The application module generator then compiles at step 740 the updated application language model and vocabulary into the application.

Once the crowdsourced audio has been sent to the application developer engine as project results, the application developer engine would kick off an acoustic model adaption process that includes the new audio as training material.

In addition to generating language variations, audio training data, the MTurk engine and IDE can be used to expand the natural language understanding component. This includes the coverage of the classes of meaning invariant units (MIUs) as well as the regular expression rules that are being used for creating an interpretation. MTurk-based expansion of the semantic understanding for a domain can be achieved via a number of custom operations and/or scripts, but the underlying mechanism is still as illustrated in FIG. 1.

In addition to the uses of the Mechanical Turk-Integrated Development Environment system describes in the paragraphs above, there are many other possible uses. For example, such system can be integrated into applications where users log their daily food intake in order to take their caloric intake. One challenge of such applications is that despite large food databases, there will always be food descriptions that are missing in such database. A possible embodiment of the system discussed thus becomes an application that logs all foods for which there was no database match. Then, the developer IDE will contain scripts that process such application logs on a regular basis such as every day and sends the data to the MTurk project engine will have yet another script that creates project tasks for MTurk members to provide additional information for such foods such as basic food category, brand name, a recipe or food preparation method. Once the MTurk results have been validated and sent back to the application module generator, the generator will update the application's food database with the new, crowdsourced information.

Yet another possible use of the invented matter disclosed herein, would be MTurk project tasks where MTurk members are asked to take pictures of the foods in their kitchen that has an UPC code. In addition to uploading pictures of the food from different angles, the MTurk members might also be asked to write down the project name and the digits of the UPC code. Once validated, the application module generator would compare all new MTurk-based data of this nature against the existing UPC code database and add missing UPC code to the database.

Another possible embodiment of this invention would be a crowdsourced based question-answering system, where users of the application can enter their questions. The application will write all questions into a database in the cloud that is integrated with the MTurk IDE. The MTurk project engine will query such question database a frequent intervals such as every 5 minutes and will use a script to transform the questions into a MTurk project task. The project results will again be processed by the application module generator which will store the question answers in a cloud-based database in fields matching the original question and the user who had asked the question when. For each new answer that is stored in the database, the user will receive a message with the answer from the mobile or web-based application. Such application would be for questions where there is no straightforward answer on the internet or where human understanding or inference is necessary for finding the answer, for example 'what's the $2^{nd}$ last president of Czechslovakia?' Another modification of this concept would be an application for local information or suggestions such as which restaurants provide vegan food or what's the best for fixing one's car.

Yet another use of the disclosed matter would be for software-based gaming development. During the application development time, the application developer can use the developer IDE to create tasks around small segments of a game such as asking for suggestions as how to continue a particular plot or what elements to display in a particular screen or asking for a review of a particular scene, role.

Another game related application includes development of Artificial Intelligence (AI) game features. A game developer can leverage an IDE instrumented with an MTurk interface to generate game data. Consider a scenario where the game developer requires an AI for an in-game character. As the developer is creating the character, the developer can create an API that selects one or more possible in-game actions that the character could take in response to a player interaction. The developer can cause the IDE to create an MTurk project comprising tasks that are configured to allow MTurk members to input possible character actions, possibly via a browser or even an app interface, based on possible player circumstances. The character actions can be compiled into a database of possible actions, which can then be integrated or compiled within the game. During game play, the game can query the action database based on the player interactions and select one or more of the actions to be taken by the in-game character. Such an approach is considered advantageous because the in-game character would exhibit more natural, complex, or engaging behaviors that mimic actual human responses. In some embodiments, the action database can be part of the actual game code or data stored in memory of the game device. In other embodiments, the action database could be an external database that could be periodically updated via continued input from MTurk members. Thus, the action database can be continually improved or changed with time in a manner that creates replay value for the game.

Yet another use case can include leveraging the disclosed techniques for generating graphical user interfaces (GUI). During application development, a developer can construct a GUI for an application within their IDE. The developer can leverage the IDE to create an MTurk project that presents a modifiable form of the GUI where MTurk members are asked to re-arrange the features of the GUI so that they consider the GUI to have a desirable optimized characteristics (e.g., reduces number of clicks to access features, speed of use, reduce error rates in selecting functionality, color schemes, etc.). Based on the compiled results or statistical results from the MTurk results, the IDE can finalize a final, go-to market configuration of the GUI.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refer to at least one of something selected from the group consisting of A, B, C . . . and N, the text should be interpreted as requiring only one element from the group, not A plus N, or B plus N, etc.

What is claimed is:

1. An application development system comprising:
  an application developer engine including a computing device having a computer processor configured to execute stored software instructions; and
  a mechanical turk engine including a computing device having a computer processor configured to execute stored software instructions said mechanical turk engine communicatively coupled with the application developer engine and at least one member interface, wherein the mechanical turk engine is configured to:
    receive a mechanical turk request;
    convert the mechanical turk request into a mechanical turk project;
    receive mechanical turk project results from at least one member interface;
    validate the mechanical turk project results;
    convert mechanical turk project results data into a module formatted for compilation by the application developer engine; and
    return project results to the application developer engine.

2. The system of claim 1, wherein the mechanical turk engine comprises a computing device configured as an Integrated Development Environment (IDE).

3. The system of claim 1, wherein the application developer engine and the mechanical turk engine are communicatively coupled over a network.

4. The system of claim 3, wherein the mechanical turk engine comprises an entity unrelated to the application developer engine.

5. The system of claim 1, wherein the mechanical turk request comprises an automatically generated project definition.

6. The system of claim 1, wherein the project results comprise a serialized data stream.

7. The system of claim 1, wherein the project results comprise raw data.

8. The system of claim 1, wherein the project results comprise the domain module.

9. The system of claim 1, wherein the mechanical turk engine comprises the application module generator.

10. The system of claim 1, wherein the application developer engine comprises the application module generator.

11. The system of claim 1, wherein the application developer engine is further configured to generate an application comprising the project results.

12. The system of claim 11, wherein the application configures a computing device on which the application executes to obtain the project results.

13. The system of claim 12, wherein the computing device modifies its behavior according to the application integrating the project results.

14. The system of claim 1, wherein the project results comprise conceptual mappings.

15. The system of claim 14, wherein the conceptual mappings represent a meaning obtained from at least one modality of communication.

16. The system of claim 15, wherein the at least one modality of communication comprises at least one of the following:
    human speech, text, visual data, kinesthetic data, auditory data, taste data, ambient data, tactile data, haptic data and location data.

17. The system of claim 1 where the mechanical turk engine is further configured to expand initial concepts based at least in part on a phrase thesaurus.

18. The system of claim 1 where the mechanical turk engine is configured to expand initial concepts based at least in part on external data sources that match a domain of the application.

19. The system of claim 1 further configured to convert the mechanical turk project results into a validation project.

20. The system of claim 19 further configured to receive validation project results from at least one member interface.

21. The system of claim 20 wherein a mechanical turk project results validation is based, at least in part, on validation project results.

22. The system of claim 20 wherein a mechanical turk project results validation is based, at least in part, on two or more validation project results.

23. The system of claim 1 wherein mechanical turk project results are stored with data annotations.

24. The system of claim 23 wherein said data annotations comprise at least one of the following: project ID, timestamp, mechanical turk member identification and mechanical turk member demographics.

25. The system of claim 23 wherein the mechanical turk project results are validated, at least in part is, based on said data annotations.

* * * * *